United States Patent
Hansen et al.

(10) Patent No.: US 11,794,443 B2
(45) Date of Patent: Oct. 24, 2023

(54) FABRIC CONTAINING UNIDIRECTIONAL REINFORCEMENT FIBRE

(71) Applicant: LM WIND POWER A/S, Kolding (DK)

(72) Inventors: Jens Zangenberg Hansen, Kolding (DK); Michael Scholarth Koefoed, Kolding (DK); Klavs Jespersen, Kolding (DK); Lars Nielsen, Kolding (DK); Morten Rask-Nielsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/623,982

(22) PCT Filed: Jul. 24, 2020

(86) PCT No.: PCT/EP2020/070933
§ 371 (c)(1),
(2) Date: Dec. 30, 2021

(87) PCT Pub. No.: WO2021/018762
PCT Pub. Date: Feb. 4, 2021

(65) Prior Publication Data
US 2022/0396051 A1     Dec. 15, 2022

(30) Foreign Application Priority Data

Jul. 26, 2019   (GB) ...................... 1910686

(51) Int. Cl.
| B32B 5/06 | (2006.01) |
| B32B 5/12 | (2006.01) |
| B32B 5/26 | (2006.01) |
| B32B 37/12 | (2006.01) |
| D04B 21/16 | (2006.01) |

(52) U.S. Cl.
CPC ............... *B32B 5/073* (2021.05); *B32B 5/12* (2013.01); *B32B 5/26* (2013.01); *B32B 37/12* (2013.01); *D04B 21/165* (2013.01); *B32B 2250/03* (2013.01); *B32B 2250/20* (2013.01); *B32B 2250/40* (2013.01); *B32B 2260/023* (2013.01); *B32B 2260/046* (2013.01); *B32B 2262/101* (2013.01); *B32B 2262/106* (2013.01); *B32B 2305/10* (2013.01); *B32B 2305/22* (2013.01);
(Continued)

(58) Field of Classification Search
None
See application file for complete search history.

(56) References Cited

U.S. PATENT DOCUMENTS 7,794,640 B2    9/2010  Healey et al.

FOREIGN PATENT DOCUMENTS

EP        2657385 A1    10/2013

OTHER PUBLICATIONS

Wang, Qingtao, et al. "Compression Properties of Interlayer and Intralayer Carbon/Glass Hybrid Composites"; Polymers; Published Mar. 21, 2018.

*Primary Examiner* — Alexander S Thomas
(74) *Attorney, Agent, or Firm* — Nath, Goldberg & Meyer; Jerald L. Meyer; Tanya E. Harkins

(57) ABSTRACT

A fabric and a method for making the same. The fabric includes a layer of unidirectionally oriented carbon fibre filaments sandwiched between a first layer of glass fibre rovings and a second layer of glass fibre rovings. The first layer of glass fibre rovings and the second layer of glass fibre rovings are linked by a connecting material.

21 Claims, 5 Drawing Sheets

Top layer

Bottom layer (52) U.S. Cl.
CPC ....... *B32B 2313/04* (2013.01); *B32B 2315/08* (2013.01); *B32B 2603/00* (2013.01)

FABRIC CONTAINING UNIDIRECTIONAL REINFORCEMENT FIBRE

This is a National Phase Application filed under 35 U.S.C. 371 as a national stage of PCT/EP2020/070933, filed Jul. 24, 2020, an application claiming the benefit of Great Britain Application No. 1910686.3, filed Jul. 26, 2019, the content of each of which is hereby incorporated by reference in its entirety.

This invention generally relates to unidirectional reinforcement yarns and fabrics containing such unidirectional reinforcement yarns. The present invention further relates to non-crimp fabrics (NCF) with improved infusibility, processability and mechanical performance.

BACKGROUND

It is known to produce fabrics, by laying several plies of fibres into a stack of required thickness. The fabrics may be of a non-crimped or warp-knitted type. The fabrics may typically be multi-axial. The term "multi-axial" means that alternate plies of fibres will be constructed in several different directions to produce a fabric with optimum strength and stiffness in required directions. Commonly used directions are 0°, +45°, −45° and 90°. Normally, the 0° plies are in the warp direction and the 90° plies in the weft direction, but other layers may contain fibres at different angles, typically at 45° or −45°.

In another situation, the fibres may be uniaxial (or unidirectional, all extending in one single orientation). The term "non-crimp" refers to fabrics where one or multiple layers of fibres are laid upon each other and transformed into a fabric by stitching or application of a binder such that the fibres remain straight and without substantial crimp. As well as offering performance advantages relative to traditional woven materials, non-crimp fabrics (NCFs) may be cheaper to produce per unit mass and be faster to manufacture. Such composites have potential for use in the production of wind turbine blade skins for example.

Non-crimped fabrics (NCF) generally comprise one or more layers of structural fibres, filaments, yarns or rovings, each layer having the fibres, filaments, yarns or rovings oriented in discrete directions. The fibres, filaments, yarns or rovings are also referred to as reinforcement fibres, filaments, yarns or rovings. The layers are typically consolidated by a stitching yarn. The prime role of the stitching is to hold the plies of the non-crimp fabric together during handling in a predominantly un-crimped manner. However, if the density of stitches is too high or the stitching is under too much tension or too thick then disruption and crimping of the fibres may occur.

Further, as the number of layers in a non-crimped fabric increases, the ability to conform to changes in shape-of the component being made (drapeability) decreases due to the restrictions imposed by the stitching. Consequently, the drape characteristics of unidirectional and biaxial NCFs are generally comparable to that of woven fabrics whereas drape is increasingly restricted with triaxials, quadraxials, etc. hence restricting possible applications.

Figure 1:
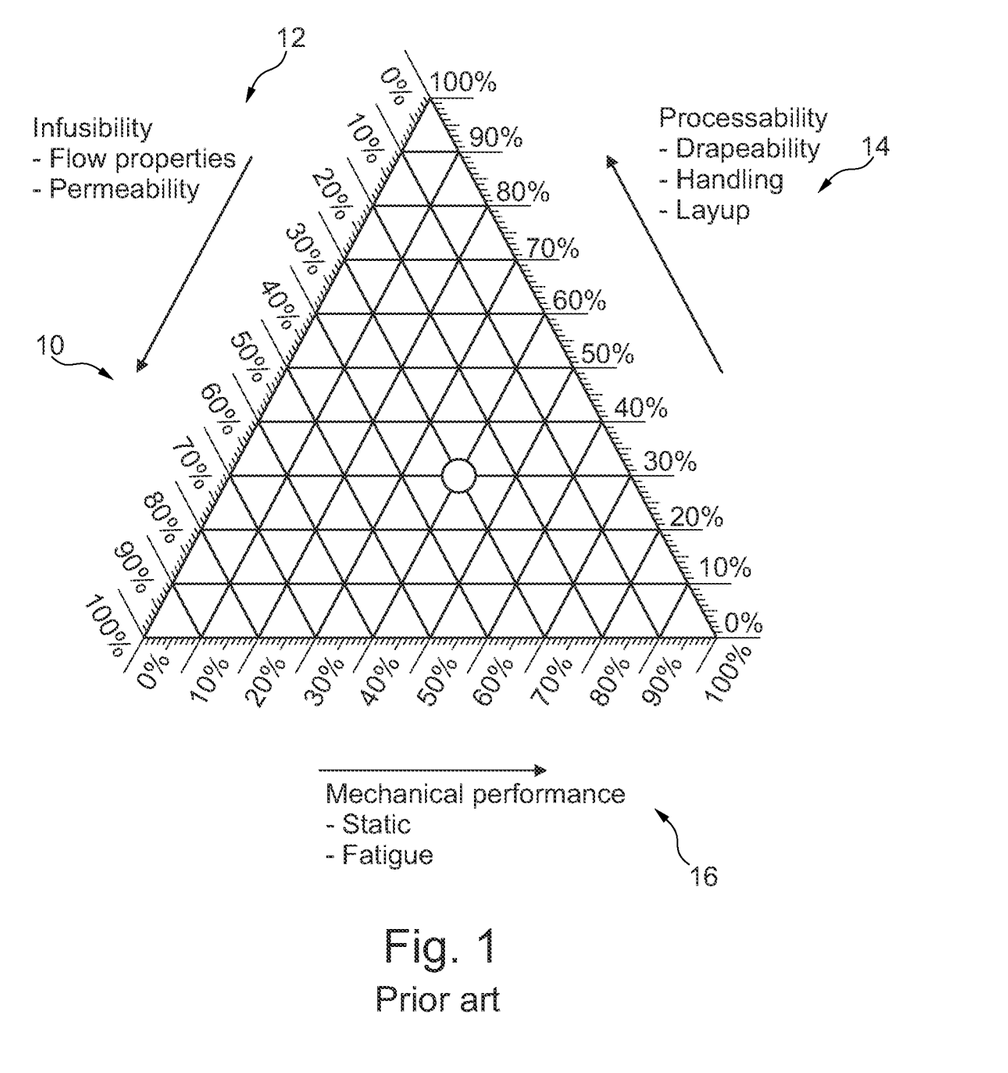
FIG. 1 illustrates a schematic representation of infusibility, processability and mechanical performance of an exemplary non-crimp fabric (prior art)

Typically, a fabric design deals with finding the best compromise between these parameters: infusibility, processability and mechanical performance. FIG. 1 illustrates a schematic representation (10) of the interrelationship between infusibility (12), processability (14) and mechanical performance (16) of an exemplary non-crimp fabric. Typically, for high-grade carbon fabrics, a single parameter is often the driver for the fabric design due to the structural application. However, for wind turbine blade manufacturing, there needs to be a reasonable optimization of the infusibility (flow properties and permeability), processability (drapeability and ease of handling and layup) and mechanical performance (under static and fatigue tests) properties of the fabric used for manufacturing.

Current fabric construction technology facilitates a compromise where all three parameters are at an acceptable level for wind turbine blade manufacturing and operation. One of the limiting design parameters is the mechanical performance of the carbon fibres under axial static loading. A large fibre bundle gives higher fabric area weight which can reduce the layup time in the mold but may also cause issues in terms of handling and infusibility (or wet-out). Therefore, it is of great importance that the fibre bundles are not too large since complete full wet-out must be ensured (to achieve satisfactory quality) and layup performance must be acceptable (to achieve satisfactory cycle time). The area weight is balanced to achieve a fabric where all carbon fibres can be wetted (equivalent of infusibility). Carbon fibres are much smaller in diameter than glass (around a factor 2-3), so a carbon fibre bundle of same size as glass fibre contain far more fibres which must be wetted.

The processability aspects often demand use of an axial warp type stitching pattern. This allows for 'channels' where the fibre bundles can slide between each other giving the right level drapeability needed to avoid wrinkles during fabric layup. Also, the stitch gauge is selected in a way to facilitate the permeability.

Typical test results show that today's uniaxial fabrics can have a good drapability and that their impregnability with matrix resin can be satisfactory. A good level of characteristic values can be achieved for components that are produced using multiaxial non-crimp fabrics, with respect to mechanical performance criteria such as flexural strength or tensile strength. However, these components often show an unsatisfactory level of characteristic values with regard to compression stresses.

The disadvantages of the unsatisfactory mechanical performance under compression loading and impact loading have been sufficiently serious thus far that, in spite of the above-mentioned better suitability of the materials especially for complex components, there remains scope for improving the infusibility, processability and mechanical performance of non-crimp fabrics.

BRIEF DESCRIPTION

According to a first aspect of the present invention, the present disclosure relates to a fabric that comprises a layer of unidirectionally oriented carbon fibre filaments sandwiched between a first layer of glass fibre rovings and a second layer of glass fibre rovings. The first layer of glass fibre rovings and the second layer of glass fibre rovings are preferably connected or linked. In a preferred embodiment, the first layer of glass fibre rovings and the second layer of glass fibre rovings are connected or linked by a connecting material.

The at least one connecting material is preferably arranged as connecting stitches between the first layer of glass fibre rovings and the second layer of glass fibre rovings. Advantageously, the connecting stitches enable matrix resin to move easily through the fabric. The connecting material may comprise at least one connecting yarn and/or at least one connecting roving. Preferably, the connecting stiches are parallel to the carbon fibre filaments and may be pillar stiches.

Alternatively or in addition, the connecting material may comprise glue and/or rivets.

In a preferred embodiment, the first layer of glass fibre rovings and the second layer of glass fibre rovings are arranged orthogonally with respect to the carbon fibre yarns. The layer of unidirectionally oriented carbon fibre yarns preferably comprises a compressive strain value greater than 7500 μStr (microstrain). In another embodiment, the layer of unidirectionally oriented carbon fibre yarns preferably comprises a compressive strain value greater than 9000 μStr.

According to a second aspect of the present invention, the present disclosure relates to a fibre preform, including a fabric described herein.

According to a third aspect of the present invention, the present disclosure relates to a composite material, including a matrix resin and a fabric described herein.

According to a fourth aspect of the present invention, the present disclosure relates to a composite article obtained by curing composite material that includes a matrix resin, and a fabric described herein.

According to a fifth aspect of the present invention, the present disclosure relates to a wind turbine including a composite material including a fabric described herein.

According to a sixth aspect of the present invention, the present disclosure relates to a method of making a fabric. The method comprises arranging a layer of unidirectionally oriented carbon fibre filaments between a first layer of glass fibre rovings and a second layer of glass fibre rovings. The method preferably includes linking or connecting the first layer of glass fibre rovings and the second layer of glass fibre rovings. In a preferred embodiment, the first layer of glass fibre rovings and the second layer of glass fibre rovings are linked or connected by a connecting material.

The method preferably further comprises using the connecting material to stitch the first layer of glass fibre rovings and the second layer of glass fibre rovings together. The connecting material is preferably arranged as connecting stitches. The connecting stiches are preferably parallel to the carbon fibre yarns. Preferably, the connecting stiches are pillar stiches. In a preferred embodiment, the connecting material comprises at least one connecting yarn. The connecting material preferably comprises at least one connecting roving. The connecting material preferably comprises glue and/or rivets.

In a preferred embodiment, the first layer of glass fibre rovings and the second layer of glass fibre rovings may be arranged approximately orthogonally with respect to the carbon fibre filaments. The layer of unidirectionally oriented carbon fibre yarns comprises an average compressive strain value greater than 7500 μStr (microstrain). In another embodiment, the layer of unidirectionally oriented carbon fibre yarns preferably comprises an average compressive strain value greater than 9000 μStr.

Various other features will be apparent from the following detailed description and the drawings.

BRIEF DESCRIPTION OF THE DRAWINGS

An example of the present invention will now be described with reference to the following drawings in which.

DETAILED DESCRIPTION

This invention includes embodiments that relate to wind turbines and more specifically to wind turbine rotors or blades. However, it is readily applicable in industries including and not limited to other types of wind-exposed surfaces negotiating aerodynamic forces, resistance and aerodynamics, such as helicopter rotor blades, fan blades, automobile, trucks and heavy machinery industries.

It shall be emphasized that with the term reinforcing fibres or reinforcing yarns, fibres or yarns are considered that are usually used in the field of fibre composite technology. Preferably, for the multifilament reinforcing yarns used in the multiaxial non-crimp fabric according to the invention, these are carbon fibre, glass fibre, or aramid yarns. Particularly preferably these are glass fibre yarns or carbon fibre yarns.

The present disclosure relates to a fabric that includes a layer of unidirectionally oriented carbon fibre yarns sandwiched between a first layer of glass fibre yarns and a second layer of glass fibre yarns. The first layer of glass fibre yarns and the second layer of glass fibre yarns are linked by a connecting material. The connecting material includes connecting stitches, connecting glue, and connecting rivets. In one embodiment of the invention the connecting stiches are pillar stiches and they are parallel to the carbon fibre yarns.

As used herein, the terms "a", "an", or "the" means "one or more" or "at least one" unless otherwise stated.

As used herein, the term "comprises" includes "consists essentially of" and "consists of." The term "comprising" includes "consisting essentially of and "consisting of."

The term "non-crimp fabric" or "non-crimped fabric", sometimes "NCF", refers to a construct that includes one or more layers of fibres, filaments, yarns or rovings. As used herein, "fibre" refers to a material having a high ratio of length to thickness. Fibres may be continuous, in which case such fibres are referred to as filaments, or staple length (i.e., discrete length).

Further, as used herein, a "yarn" is a continuous strand of one or more fibres, one or more filaments, or material in a form suitable for use in the production of textiles, sewing, crocheting, knitting, weaving, stitching, etc. Yarns include, for example, (1) a plurality of filaments laid or bundled together without applied or intentional twist, sometimes referred to as a zero-twist yarn or a non-twisted yarn; (2) a plurality of filaments laid or bundled together and are either interlaced, have false-twist, or are textured in some manner; (3) a plurality of filaments laid or bundled together with a degree of twist, sometimes referred to as a twisted yarn; (4) a single filament with or without twist, sometimes referred to a monofilament or monofilament yarn. Textured yarns may be filament or spun yarns that have been given noticeably greater volume through physical, chemical, or heat treatments or a combination of these. In some instances, a yarn is called a filament yarn or a multifilament yarn, both of which are generally yarns made from a plurality of filaments.

Furthermore, as used herein, a "roving" is a multitude of straight, that is, untwisted filaments of very small diameter, that is, about 5-24 micron each. The roving can also be assembled of strands, each strand comprising a very large number of glass filaments. Thus, in one roving there are multiple strands and each strand consisting of multiple filaments of very small diameter, that is, about 5-25 micron each.

The fibres, filaments, yarns or rovings in a single layer are arranged such that they are parallel to each other and oriented in a single direction (i.e., unidirectional or synonymously, uniaxial).

Multiple layers may be stacked so that the fibres, filaments, yarns or rovings of one layer are oriented parallel to the fibres, filaments, yarns or rovings of an adjacent layer or are oriented crosswise to the fibres, filaments, yarns or rovings of an adjacent layer. When the fibres, filaments, yarns or rovings of one layer are oriented crosswise to the fibres, filaments, yarns or roving s of an adjacent layer, the angles between the axis of one layer, the axis being determined by the direction of the fibres, filaments, yarns or rovings in the layer, and that of the axis of the adjacent layer are virtually infinitely adjustable. For example, the angles between adjacent fibre layers may be 0° or 90°, or such angles plus or minus 25°, plus or minus 30°, plus or minus 45°, or plus or minus 60°, the zero-degree direction being determined by methods known to those of ordinary skill in the art. For example, the machine direction may be designated as the 0° direction. Accordingly, the term "multiaxial" refers to an NCF fabric having more than one layer, each layer oriented in various directions.

Multiaxial fabrics include biaxial fabrics in which the layers are oriented in two directions and triaxial fabrics in which the layers are oriented in three directions, and so on. Multiaxial non-crimp fabrics can be produced e.g. by means of warp knitting looms or stitch bonding machines. In an embodiment, the non-crimp fabric comprises one layer of unidirectionally oriented multifilament carbon yarns. In another embodiment, the non-crimp fabric comprises more than one layer of unidirectionally oriented multifilament carbon yarns. In an embodiment, the non-crimp fabric comprises more than one layer of unidirectionally oriented multifilament carbon yarns, which layers are oriented in the same direction. In another embodiment, the non-crimp fabric comprises more than one layer of unidirectionally oriented multifilament carbon yarns, which layers are oriented in different directions.

The unidirectionally oriented multifilament carbon yarns within a single layer of the NCF of the present disclosure are interlinked by a single or multifilament reinforcement yarn having certain properties that contribute to improve mechanical performance of the NCF fabric. The polymeric fibres of the multifilament reinforcement yarn may be fibres of polyamides such as aliphatic polyamides (PA), cycloaliphatic polyamides, aromatic polyamides, polyphthalamides (PPA), ether or ester block polyamides (PEBAX, PEBA), polyesters such as polyethyleneterephthalates (PET), polyethylenenaphthalates (PEN) and Polytrimethylene terephthalate (PTT), polyolefins such as polypropylenes (PP), polyethylenes (PE), thermoplastic polyolefins (TPO) such as Ethylene Propylene Diene (EPDM) and Ethylene Propylene (EPR) rubbers, polyphenylene sulfides (PPS), polyetherimides (PEI), polyimides (PI), polyimides having phenyltrimethylindane structure, polyamidoamides (PAI), polysulfones, polyarylsulfones such as polyethersulfone (PES), polyethersulfone-etherethersulfone (PES:PEES), polyetherethersulfone (PEES), polyketones, polyaryletherketone (PAEK) such as polyetherketone (PEK), polyetheretherketone (PEEK) and polyetherketoneketones (PEKK), polyurethanes, polyether or polyester-b-urethanes, thermoplastic polyurethanes, polycarbonates, polyacetals, polyphenyleneoxides (PPO), polyethers, polyethernitriles, polybenzimidazoles, thermoplastic elastomers, such as Styrene Ethylene Butylene Styrene (SEBS), Styrene Ethylene Propylene Styrene (SEPS) and Styrene Butylene Styrene (SBS) block copolymers and hydrogenated versions thereof, vulcanized thermoplastic elastomers (TPV) such as vulcanized Ethylene Propylene Diene block copolymers; liquid crystal polymers (LCPs), and combinations and copolymers thereof.

In one embodiment of the invention, the polymeric fibres of the multifilament reinforcement yarn are polyamide, polyester, polyhydroxyethers, or copolymers thereof. In another embodiment, the polymeric fibres of the multifilament reinforcement yarn comprise PA 6, PA 6/6, PA 6T, PA 12, PA 6/10, PA 9T, PA 10/10, PA 10T, PA11, PA 6/12, PA 10/12, or blends or copolymers thereof.

In another embodiment of the invention, a single-filament or multifilament reinforcement yarn may be characterized by filament count, which is the number of filaments making up the yarn. The filament count of the multifilament reinforcement yarn, in accordance with one embodiment of this invention, is typically 36, as a non-limiting example.

The fibres or filaments of the multifilament reinforcement yarn may be interlaced, also referred to as entangled or intermingled, according to methods known to those of ordinary-skill in the art. For example, yarn filaments may be intermingled by exposing a plurality of filaments to a localized fluid jet, such as an air stream. Intermingling gives rise to points of entanglement, called nodes, which are separated by spaces of unentangled filaments. Thus, the extent of intermingling is typically given as the number of nodes per meter of yarn. The extent of intermingling of the multifilament reinforcement yarn is approximately 1 cm apart, for instance, 100 nodes per meter, as a non-limiting example.

In an embodiment, the non-crimp fabric is multiaxial and comprises more than one layer of unidirectionally oriented multifilament carbon yarns. The layers of a multiaxial NCF fabric can be connected and secured to each other according to methods known to those of ordinary skill in the art, for example, by a plurality of stitching or knitting threads arranged parallel to each other and running parallel to each other and forming stitches. The stitching or knitting threads used to connect and secure the layers of the multiaxial NCF fabric to each other may be the same as or different from the multifilament reinforcement yarn described herein. In an embodiment, the stitching or knitting threads used to connect and secure the layers of the multiaxial NCF fabric to each other is the same as the multifilament reinforcement yarn described herein.

The multifilament reinforcement yarn holds together the unidirectionally oriented multifilament yarns within a single layer of the NCF and/or secures two or more layers in the NCF fabric to one another and does not provide any structural reinforcement. Thus, the multifilament reinforcement yarn used according to the present disclosure for interlinking of the unidirectionally oriented multifilament carbon yarns within a single layer of the NCF and/or the consolidation of two or more layers in the NCF fabric is non-structural. In contrast, the unidirectionally oriented multifilament carbon yarns are structural as they provide structural reinforcement in a composite material or article made therefrom.

The exemplary non-crimp fabric of the current disclosure may further comprise one or more layers of a support yarn. For example, the non-crimp fabric may comprise a layer of unidirectionally oriented multifilament reinforcement yarns sandwiched between a first layer of multifilament support yarns and a second layer of multifilament support yarns, each of the first and the second layers of multifilament support yarns contacting and supporting the unidirectionally oriented multifilament reinforcement yarns. Any supporting yarn known to those of ordinary skill in the art may be used. In one preferred embodiment of the invention, supporting yarns are made of glass fibre. The layers constituting the NCF fabric, including the one or more layers of supporting yarn, can be connected and secured to each other according to methods known to those of ordinary skill in the art, for example, by a plurality of stitching or knitting threads or yarns. The supporting yarn layer, when used, advantageously provides improved process performance, such as permeability; mechanical performance, such as impact and delamination resistance; as well as fabric integrity or stability so that the fabric can be handled easily.

The interlinking of the unidirectionally oriented multifilament carbon yarns within a single layer of the NCF and/or the consolidation of two or more layers in the NCF fabric may be achieved using various stitch types, stitch width (i.e., the distance between the points in the weft direction), and stitch lengths (i.e., the distance between the points in the warp direction) known to those of ordinary skill in the art. Suitable stitch patterns include straight stitches, chain or pillar stitches, lock stitches, zig-zag (also known as tricot stitches, or a combination thereof. In an embodiment, the stitch pattern is a tricot pillar. There is no particular limitation to the stitch width and the stitch length that may be used. The stitch length may be in the range of 1 to 20 mm, typically 1 to 10 mm, for instance.

Preferably, the stitching threads run substantially transversely through the plies and follows a predetermined pattern. The pattern may be tricot closed, open pillar stitch, closed pillar stitch, open tricot-pillar stitch, or closed tricot-pillar stitch or variants thereof.

The present disclosure also relates to a fibre preform comprising the fabric described herein. The fibre preform comprises at least one layer of the non-crimp fabric.

As used herein, the term "preform" refers to a construct in which one or more layers of reinforcement material, such as the NCF fabric described herein, are laid without matrix resin in a mold for further processing, such as infusion or injection of matrix resin, to form a composite material or article.

The fibre preform may further comprise layers of any type of textiles known to those of ordinary skill for manufacturing composite materials. Examples of suitable fabric types or configurations include, but are not limited to: all woven fabrics, examples of which are plain weave, twill weave, sateen weave, spiral weave, and uni-weave fabrics; warp-knitted fabrics; knitted fabrics; braided fabrics; all non-woven fabrics, examples of which include, but are not limited to, supporting yarns, mat fabrics composed of chopped and/or continuous fibre filaments, felts, and combinations of the aforementioned fabric types.

In an embodiment, the fibre preform may further comprise a supporting yarn. Any supporting yarns known to those of ordinary skill in the art may be used. A binder component may be distributed on at least one side of the supporting yarn layer or penetrated through portions of the supporting yarn, or distributed throughout the non-crimp fabric, including in spaces between the unidirectionally oriented fibres and on portions of the veil. The binder may be present in an amount less than or equal to 15% by weight or less of the final fabric. Typically, the binder component does not form a continuous film at the surface of the fibrous material.

The present disclosure relates to a process for making an NCF fabric, the process comprising interlinking a plurality of multifilament carbon yarns into a unidirectionally oriented layer using a multifilament reinforcement yarn. When the NCF fabric comprises more than one layer, the multiple layers may be connected and secured to each other by stitching or knitting according to known methods using a reinforcement yarn, such as the multifilament reinforcement yarn described herein. When the NCF fabric is multiaxial, the production of such multiaxial NCF is known and makes use of conventional techniques.

Composite materials may be made by molding a preform and infusing the preform with a thermosetting resin in a number of liquid-molding processes. Liquid-molding processes that may be used include, without limitation, vacuum-assisted resin transfer molding (VARTM), in which resin is infused into the preform using a vacuum-generated pressure differential. Another method is resin transfer molding (RTM), wherein resin is infused under pressure into the preform in a closed mold. A third method is resin film infusion (RFI), wherein a semi-solid resin is placed underneath or on top of the preform, appropriate tooling is located on the part, the part is bagged and then placed in an autoclave to melt and infuse the resin into the preform.

Thus, the present disclosure also relates to a composite material, comprising: a matrix resin, and the fabric described herein.

The matrix resin for impregnating or infusing the preforms described herein is a curable resin. "Curing" or "cure" in the present disclosure refers to the hardening of a polymeric material by the chemical cross-linking of the polymer chains. The term "curable" in reference to a composition means that the composition is capable of being subjected to conditions which will render the composition to a hardened or thermoset state. The matrix resin is typically a hardenable or thermoset resin containing one or more uncured thermoset resins. Suitable matrix resins include, but are not limited to, epoxy resins, oxetanes, imides (such as polyimide or bismaleimide), vinyl ester resins, cyanate ester resins, isocyanate-modified epoxy resins, phenolic resins, furanic resins, benzoxazines, formaldehyde condensate resins (such as with urea, melamine or phenol), polyesters, acrylics, hybrids, blends and combinations thereof.

Suitable epoxy resins include glycidyl derivatives of aromatic diamine, aromatic mono primary amines, aminophenols, polyhydric phenols, polyhydric alcohols, polycarboxylic acids and non-glycidyl resins produced by peroxidation of olefinic double bonds. Examples of suitable epoxy resins include polyglycidyl ethers of the bisphenols, such as bisphenol A, bisphenol F, bisphenol S, bisphenol K and bisphenol Z; polyglycidyl ethers of cresol and phenol-based novolacs, glycidyl ethers of phenol-aldehyde adducts, glycidyl ethers of aliphatic dials, diglycidyl ether, diethylene glycol diglycidyl ether, aromatic epoxy resins, aliphatic polyglycidylethers, epoxidised olefins, brominated resins, aromatic glycidyl amines, heterocyclic glycidyl imidines and amides, glycidyl ethers, fluorinated epoxy resins, or combinations thereof.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Suitable oxetane compounds, which are compounds that comprise at least one oxetano group per molecule, include compounds such as, for example, 3-ethyl-3 [[(3-ethyloxetane-3-yl) methoxy]methyl]oxetane, oxetane-3-methanol, 3,3-bis-(hydroxymethyl) oxetane, 3-butyl-3-methyl oxetane, 3-methyl-3-oxetanemethanol, 3,3-dipropyl oxetane, and 3-ethyl-3-(hydroxymethyl) oxetane.

The curable matrix resin may optionally comprise one or more additives such as curing agents, curing catalysts, co-monomers, rheology control agents, tackifiers, inorganic or organic fillers, thermoplastic and/or elastomeric polymers as toughening agents, stabilizers, inhibitors, pigments, dyes, flame retardants, reactive diluents, UV absorbers and other additives well known to those of ordinary skill in the art for modifying the properties of the matrix resin before and/or after curing.

Examples of suitable curing agents include, but are not limited to, aromatic, aliphatic and alicyclic amines, or guanidine derivatives. Suitable aromatic amines include 4,4'-diaminodiphenyl sulphone (4,4'-DDS), and 3,3' diaminodiphenyl sulphone (3,3'-DDS), 1,3-diaminobenzene, 1,4-diaminobenzene, 4,4'-diammodiphenylmethane, benzenediamine(BDA); Suitable aliphatic amines include ethylenediamine (EDA), 4,4'-methylenebis(2,6-diethylaniline) (M-DEA), m-xylenediamine (mXDA), diethylenetriamine (DETA), triethylenetetramine (TETA), trioxatridecanediamine (TTDA), polyoxypropylene diamine, and further homologues, alicyclic amines such as diaminocyclohexane (DACH), isophoronediamine (IPDA), 4,4' diamino dicyclohexyl methane (PACM), bisaminopropylpiperazine (BAPP), N-aminoethylpiperazine (N-AEP); Other suitable curing agents also include anhydrides, typically polycarboxylic anhydrides, such as nadic anhydride, methylnadic anhydride, phthalic anhydride, tetrahydrophthalic anhydride, hexahydrophthalic anhydride, methyltetrahydrophthalic anhydride, methylhexahydrophthalic anhydride, endomethylene-tetrahydrophtalic anhydride, pyromellitic dianhydride, chloroendic anhydride and trimellitic anhydride.

Still other curing agents are Lewis acid: Lewis base complexes. Suitable Lewis acid: Lewis base complexes include, for example, complexes of: BCl3:amine complexes, BF3: amine complexes, such as BF3:monoethylamine, BF3:propylamine, BF3:isopropyl amine, BF3:benzyl amine, BF3:chlorobenzyl amine, BF3:trimethylamine, BF3:pyridine, BF3:THF, AlCl3:THF, AlCl3:acetonitrile, and ZnCl2:THF.

Additional curing agents are polyamides, polyamines, amidoamines, polyamidoamines, polycycloaliphatic, polyetheramide, imidazoles, dicyandiamide, substituted ureas and urones, hydrazines and silicones.

Urea based curing agents are the range of materials available under the commercial name DYHARD (marketed by Alzchem), and urea derivatives, such as the ones commercially available as UR200, UR300, UR400, UR600 and UR700. Urone accelerators include, for example, 4,4-methylene diphenylene bis (N,N-dimethyl urea) (available from Onmicure as U52 M).

Suitable toughening agents may include, but are not limited to, homopolymers or copolymers either alone or in combination of polyamides, copolyamides, polyimides, aramids, polyketones, polyetherimides (PEI), polyetherketones (PEK), polyetherketoneketone (PEKK), polyetheretherketones (PEEK), polyethersulfones (PES), polyethersulfones (PEES), polyesters, polyurethanes, polysulphones, polysulphides, polyphenylene oxide (PPO) and modified PPO, polyethylene oxide) (PEO) and polypropylene oxide, polystyrenes, polybutadienes, polyacrylates, polystyrene, polymethacrylates, polyacrylics, polyphenylsulfone, high performance hydrocarbon polymers, liquid crystal polymers, elastomers, segmented elastomers and core-shell particles.

The toughening particles or agents may be in the form of particles having a diameter less than or equal to 5 microns, typically less than or equal to 1 micron in diameter. The size of the toughening particles or agents may be selected such that they are not filtered by the fibre reinforcement. Optionally, the composition may also comprise silica-gels, calcium-silicates, silica oxide, phosphates, molybdates, fumed silica, amorphous silica, amorphous fused silica, clays, such as bentonite, organo-clays, aluminium-trihydrates, hollow glass microspheres, hollow polymeric microspheres, microballoons and calcium carbonate.

The carbon of the multifilament carbon yarns may be in the form of Carbon Mitsubishi TRW40 50 L KN continuous tow. The carbon may be metallized with discontinuous or continuous metal layers. The carbon fibres, typically filaments, may be unsized or sized with a material that is compatible with the resin composition.

The mold for resin infusion may be a two-component, closed mold or a vacuum bag sealed, single-sided mold.

The present disclosure additionally relates to a wind turbine including a composite material described hereinabove.

The multifilament reinforcement yarn described herein has a low amount of twist. The multifilament reinforcement yarn has a twist of less than 200 revolutions per meter. In an embodiment, the reinforcement yarn has a twist of less than 150 r/m, typically less than 100 r/m, more typically less than 50 r/m. In an embodiment, the reinforcement yarn has no twist.

Other parameters that may influence the mechanical performance is the tension and its control on the reinforcement yarn during its insertion into the NCF, the tension and its control on the carbon fibres, the influence of the carbon areal weight, the orientation of the carbon ply and the stitching pattern combined with the stitching length, among others.

Any method known to those of ordinary skill in the art may be used to measure the mechanical properties related to the fabric, preform, composite material, and/or composite article disclosed herein. For example, optical microscopy may be used to visualize the mechanical performance and measurements made using digital imaging software.

The NCF fabric, reinforcement yarn, and the preform, composite material, and composite article made therefrom according to the present disclosure are further illustrated by the following non-limiting example.

EXAMPLE

Non-limiting and exemplary fabric UNIAXIAL 599 CARBON consists of untwisted carbon tows with +85° glass fibres on both sides. The non-woven fabric is stitched together by polyester stitching yarns. The number 599 defines the area weight of the 0° fibres. The material is used for VARTM (Vacuum Assisted Resin Transfer Moulding) of wind turbine blades. The material is typically infused with an appropriate resin and is typically stacked in 50+ layers for some applications. Therefore, it is important that the fabric can lay flat into the molds without wrinkles of any kind, i.e. even tension of all tows is very important. Some layers will go from the blade root section to the blade tip without any cuts in between. This specification includes all widths and roll lengths. The material names are "UNIAXIAL 599 CARBON XXCM" where 'XX' is the width of the fabric.

The machine set up and the fabric input materials, weight and other parametric dimensions of the fabric, and processing characteristics of the fabric are typically critical for efficient blade manufacturing, since the fabric can have implications on the manufacturing process. This is particularly critical as laminates can be built by stacking 50+ dry plies on top of each other with some of the plies going all the way from the blade root section to the blade tip. For these reasons it is very important that the fabric can lay flat into the molds without wrinkles of any kind, i.e. even tension of all tows is very important.

In one another embodiment, exemplary processing characteristics of the fabric can be characterized by parameters such as: curvature of unrolled fabric, wrinkle height in dry fabric, edge lift, edge curling limits, drapeability, roll telescoping, rolling direction.

Figure 2:
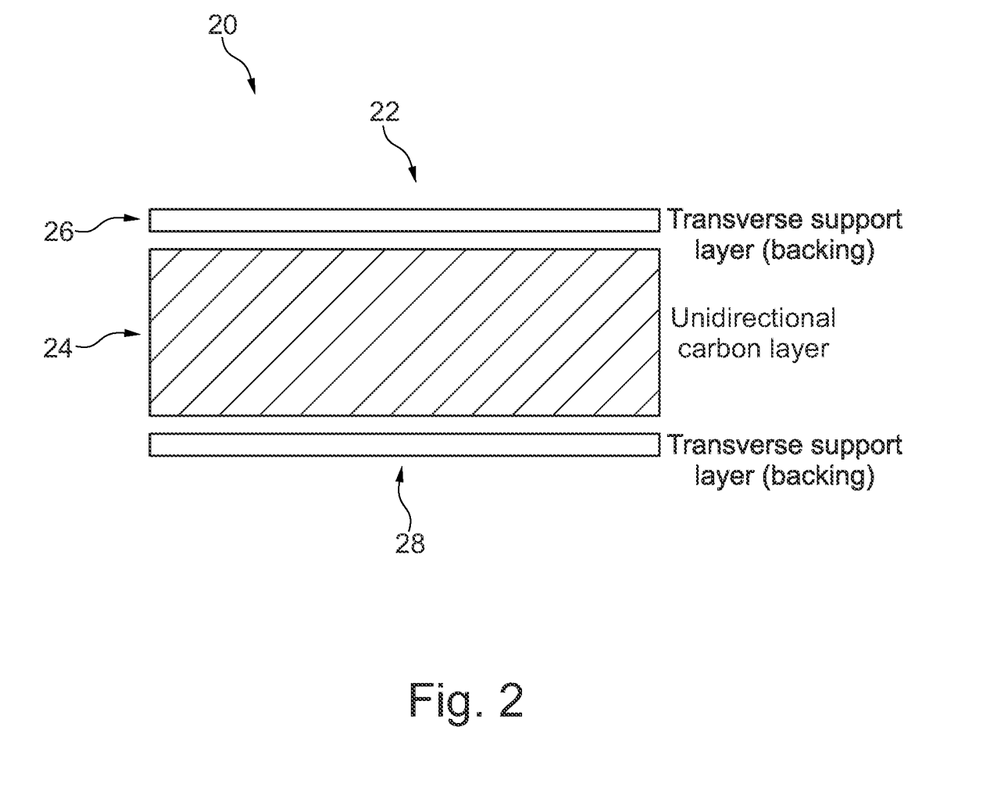
FIG. 2 illustrates schematic representation of an exemplary non-crimp fabric in accordance with one embodiment of this invention.

FIG. 2 illustrates a schematic representation (20) of an exemplary non-crimp fabric (22) in accordance with one embodiment of the current invention. Referring to FIG. 2, non-crimp fabric (22) includes a layer of unidirectionally oriented carbon fibre filaments (24) sandwiched between a first layer of glass fibre rovings of glass fibre (26) at the top and a second layer of glass fibre rovings (28) at the bottom. The first layer of glass fibre rovings (26) and the second layer of glass fibre rovings (28) are typically arranged approximately orthogonally with respect to the carbon fibre yarns. Further, the first layer of glass fibre rovings (26) and the second layer of glass fibre rovings (28) are typically linked by a connecting material. In one embodiment of the invention, the connecting material is arranged as connecting stitches between the first layer of glass fibre rovings and the second layer of glass fibre rovings. The connecting stiches, in such embodiments, are typically parallel to the carbon fibre filaments. In other embodiments of the invention, the connecting material may be a connecting yarn or a connecting roving or glue and/or rivets.

Figure 3:
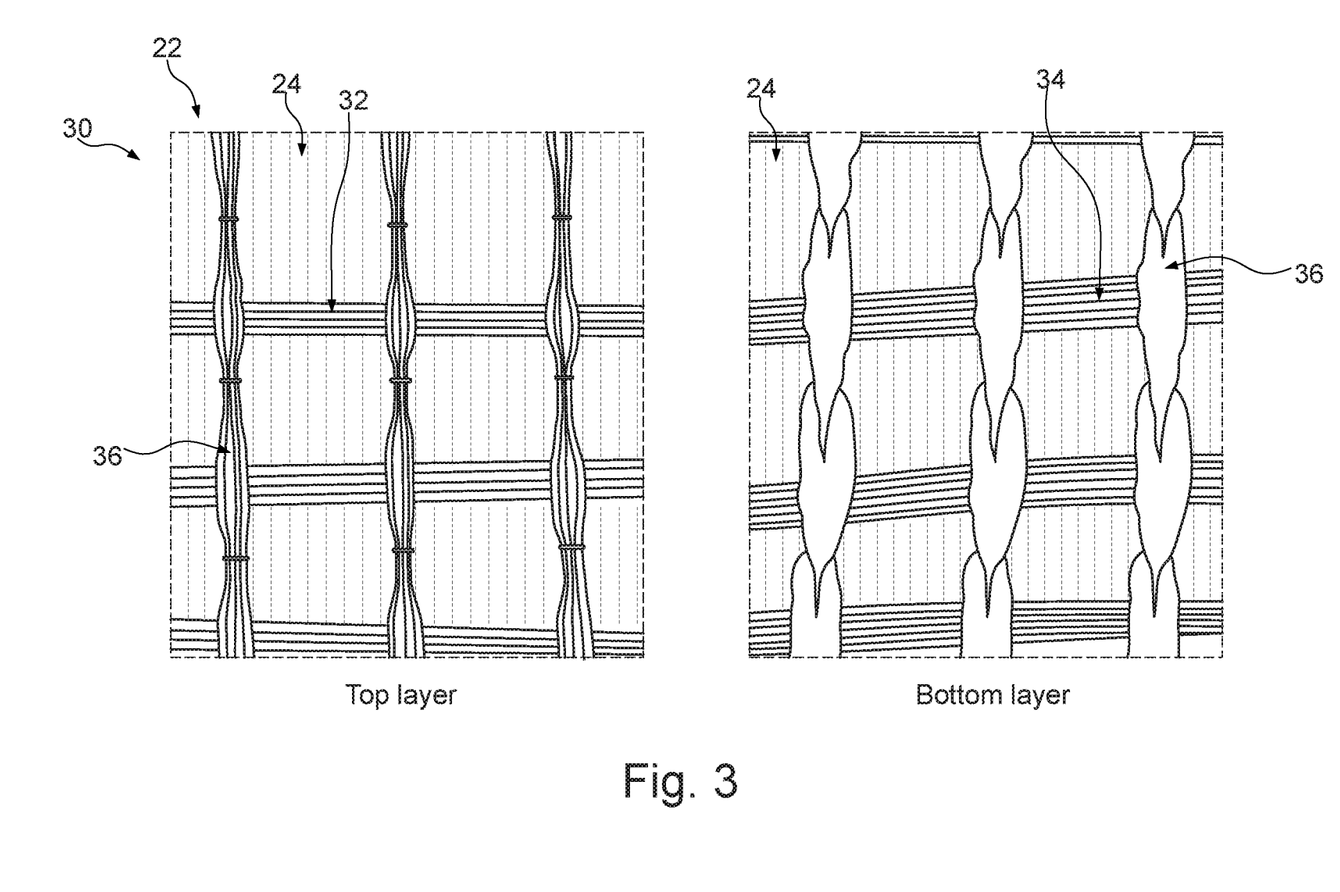
FIG. 3 illustrates an alternative close-up view of an exemplary non-crimp fabric of FIG. 2.
Figure 4:
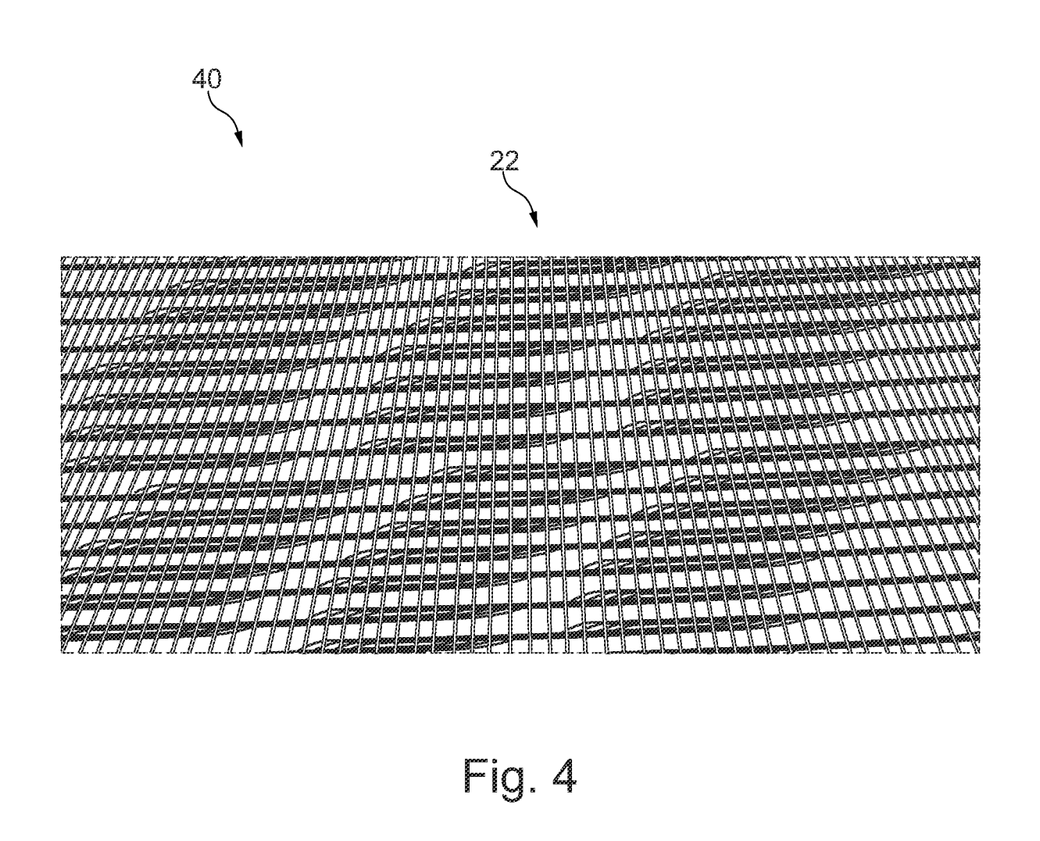
FIG. 4 is a reproduction of a photographic view of the exemplary non-crimp fabric of FIG. 2.
Figure 5:
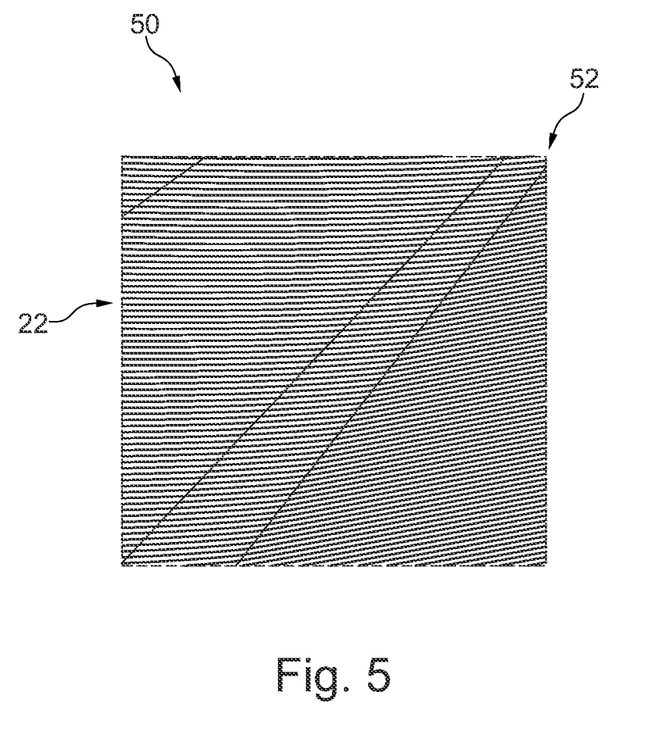
FIG. 5 is an alternative reproduced photographic view of the exemplary non-crimp fabric of FIG. 2.

FIG. 3 is a close up view (30) of the exemplary non-crimp fabric (22) of FIG. 2. Referring to FIG. 3, there is a straight stitching yarn (36) in the top transverse layer of glass fibre (32) and further, there is a loop of stitching yarn (36) in the bottom transverse layer of glass fibre (34). FIG. 4 is a reproduction of a photographic view (40) of the fabric (22) architecture. FIG. 5 is an alternate reproduced photographic view (50) of the fabric (22) in an exemplary blade mold layup (52).

Several different stitching patterns for non-crimp fabrics are known in the prior art. Stitching yarns are typically made of polyester threads. Thickness and weight of stitching yarns are selected so that infusion is improved.

In order to avoid wrinkles, unidirectional carbon yarns are desired to be kept as straight as possible with no force pulling the carbon filaments from-side-to-side. Keeping carbon fibres straight improves strength of the fabric. Stitching patterns such as the pillar structure keep the carbon fibre straight and minimizes undulation. Further, typically more stitches amount to more holes and that in turn translates into better infusibility. Furthermore, the sandwich configuration and the stitching structure described herein improves drapability and mechanical performance of the fabric.

In one embodiment of the invention, exemplary infusibility characteristics of the fabric can be characterized at least in terms of permeability along roll direction, permeability perpendicular to roll direction, permeability in through thickness direction, infused laminate thickness, and infused laminate quality.

In one another embodiment, exemplary mechanical properties of the fabric can be characterized at least in terms of Inter-Laminar Shear Strength, E-modulus, Linear estimate of tensile elongation at break, Linear estimate of compressive strain at break, Tensile strength, Tensile shear strength and Fatigue life. Further, in one particular embodiment of the invention, the unidirectionally oriented carbon fibre yarns may be characterized by a compressive strain value greater than 6000 µStr (microstrain). In another embodiment, the layer of unidirectionally oriented carbon fibre yarns preferably comprises a compressive strain value greater than 7000 µStr. In yet another embodiment, the layer of unidirectionally oriented carbon fibre yarns preferably comprises a compressive strain value greater than 7500 µStr (microstrain). In another embodiment, the layer of unidirectionally oriented carbon fibre yarns preferably comprises a compressive strain value greater than 8000 µStr. In a further embodiment, the layer of unidirectionally oriented carbon fibre yarns preferably comprises a compressive strain value greater than 8500 µStr. In yet another embodiment, the layer of unidirectionally oriented carbon fibre yarns preferably comprises a compressive strain value greater than 9000 µStr. In a further embodiment, the layer of unidirectionally oriented carbon fibre yarns preferably comprises a compressive strain value greater than 9500 µStr.

A technical contribution for the disclosed non-crimp fabric and method of making the same is that it improves the infusibility, processability and mechanical performance of non-crimp fabrics.

According to one embodiment of the invention, there is provided a fabric that includes a layer of unidirectionally oriented carbon fibre filaments sandwiched between a first layer of glass fibre rovings and a second layer of glass fibre rovings. The first layer of glass fibre rovings and the second layer of glass fibre rovings are linked by a connecting material.

According to another embodiment of the invention, there is provided a fibre preform, including a fabric described herein, that includes a layer of unidirectionally oriented carbon fibre filaments sandwiched between a first layer of glass fibre rovings and a second layer of glass fibre rovings. The first layer of glass fibre rovings and the second layer of glass fibre rovings are linked by a connecting material.

According to yet another embodiment of the invention, there is provided a composite material, including a matrix resin and a fabric described herein, that includes a layer of unidirectionally oriented carbon fibre filaments sandwiched between a first layer of glass fibre rovings and a second layer of glass fibre rovings. The first layer of glass fibre rovings and the second layer of glass fibre rovings are linked by a connecting material.

According to one further embodiment of the invention, there is provided a composite article obtained by curing composite material that includes a matrix resin, and a fabric described herein, that includes a layer of unidirectionally oriented carbon fibre filaments sandwiched between a first layer of glass fibre rovings and a second layer of glass fibre rovings. The first layer of glass fibre rovings and the second layer of glass fibre rovings are linked by a connecting material.

According to yet another embodiment of the invention, there is provided a wind turbine including a composite material including a fabric described herein, that includes a layer of unidirectionally oriented carbon fibre filaments sandwiched between a first layer of glass fibre rovings and a second layer of glass fibre rovings. The first layer of glass fibre rovings and the second layer of glass fibre rovings are linked by a connecting material.

According to one further embodiment of the invention, there is provided a method of making a fabric described herein. The method includes arranging a layer of unidirectionally oriented carbon fibre filaments between a first layer of glass fibre rovings and a second layer of glass fibre rovings and linking the first layer of glass fibre rovings and the second layer of glass fibre rovings by a connecting material. The first layer of glass fibre rovings and the second layer of glass fibre rovings are typically arranged approximately orthogonally with respect to the carbon fibre yarns In one embodiment of the invention, the connecting material is arranged as connecting stitches between the first layer of glass fibre rovings and the second layer of glass fibre rovings. The connecting stiches, in such embodiments, are typically parallel to the carbon fibre filaments. In other embodiments of the invention, the connecting material may be a connecting yarn or a connecting roving or glue and/or rivets. The method further includes using the connecting material to stitch the first layer of glass fibre rovings and the second layer of glass fibre rovings together.

While the invention has been described in detail in connection with only a limited number of embodiments, it should be readily understood that the invention is not limited to such disclosed embodiments. Further, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description, but is only limited by the scope of the appended claims.

PARTS LIST

- 10 schematic representation of infusibility, processability and mechanical performance of an exemplary fabric
- 12 infusibility
- 14 processability
- 16 mechanical performance
- 20 schematic representation of an exemplary fabric
- 22 fabric
- 24 uniaxial carbon layer
- 26 top transverse layer of glass fibre
- 28 bottom transverse layer of glass fibre
- 30 schematic representation of an exemplary fabric
- 32 top transverse layer of glass fibre
- 34 bottom transverse layer of glass fibre
- 36 stitching yarn
- 40 photographic view of the fabric (22) architecture
- 50 alternate photographic view of the fabric (22) in an exemplary blade mold
- 52 blade mold layup

What is claimed is:

1. A fabric comprising:
a layer of unidirectionally oriented carbon fibre filaments sandwiched between a first layer comprising glass fibre yarns or rovings and a second layer comprising glass fibre yarns or rovings,
wherein the first layer of glass fibre yarns or rovings and the second layer of glass fibre yarns or rovings are linked by a connecting material,
wherein the connecting material comprises connecting stitches between the first layer and the second layer, and wherein the connecting stitches are parallel to the unidirectionally oriented carbon fibre filaments.

2. The fabric of claim 1, wherein the connecting material comprises at least one connecting yarn.

3. The fabric of claim 1, wherein the connecting stiches are pillar stiches.

4. The fabric of claim 1, wherein the connecting material comprises glue and/or rivets.

5. The fabric of claim 1, wherein the first layer and the second layer are arranged non-parallel with respect to the unidirectionally oriented carbon fibre filaments.

6. The fabric of claim 1, wherein the layer of unidirectionally oriented carbon fibre filaments comprises an average compressive strain value greater than 7500 μStr.

7. The fabric of claim 1, wherein the layer of unidirectionally oriented carbon fibre filaments comprises an average compressive strain value greater than 9000 μStr.

8. A fibre preform comprising a fabric according to claim 1.

9. A composite material, comprising:
a matrix resin; and
a fabric according to claim 1.

10. A composite article obtained by curing composite material, comprising:
a matrix resin; and
a fabric according to claim 1.

11. A blade for a wind turbine comprising a composite material comprising a fabric according to claim 1.

12. A method for making a fabric, the method comprising:
arranging a layer of unidirectionally oriented carbon fibre filaments between a first layer of glass fibre yarns or rovings and a second layer of glass fibre yarns or rovings; and
linking the first layer of glass fibre yarns or rovings and the second layer of glass fibre yarns or rovings by a connecting material, wherein the connecting material comprises connecting stitches between the first layer and the second layer, and wherein the connecting stitches are parallel to the unidirectionally oriented carbon fibre filaments.

13. The method of claim 12, the method further comprising using the connecting material to stitch the first layer of glass fibre rovings and the second layer of glass fibre rovings together.

14. The method of claim 13, wherein the connecting material is arranged as connecting stitches.

15. The method of claim 14, wherein the connecting stiches are parallel to the unidirectionally oriented carbon fibre filaments.

16. The method of claim 15 wherein the connecting stiches are pillar stiches.

17. The method of claim 13, wherein the connecting material comprises at least one connecting roving.

18. The method of claim 13, wherein the connecting material comprises glue and/or rivets.

19. The method of claim 13, wherein the first layer of glass fibre rovings and the second layer of glass fibre rovings are arranged about orthogonally with respect to the carbon fibre filaments.

20. The method of claim 13, wherein the layer of unidirectionally oriented carbon fibre filaments comprises an average compressive strain value greater than 7500 μStr.

21. The method of claim 13, wherein the layer of unidirectionally oriented carbon fibre filaments comprises a compressive strain value greater than 9000 μStr.

* * * * *